No. 844,615. PATENTED FEB. 19, 1907.
I. E. PALMER.
WHEELED VEHICLE.
APPLICATION FILED JUNE 27, 1906.

3 SHEETS—SHEET 1.

No. 844,615. PATENTED FEB. 19, 1907.
I. E. PALMER.
WHEELED VEHICLE.
APPLICATION FILED JUNE 27, 1906.

3 SHEETS—SHEET 3.

Witnesses:-
F. George Barry
J Henry Thieme

Inventor:-
Isaac E. Palmer
by attorneys

UNITED STATES PATENT OFFICE.

ISAAC E. PALMER, OF MIDDLETOWN, CONNECTICUT.

WHEELED VEHICLE.

No. 844,615.

Specification of Letters Patent.

Patented Feb. 19, 1907.

Application filed June 27, 1906. Serial No. 323,543.

*To all whom it may concern:*

Be it known that I, ISAAC E. PALMER, a citizen of the United States, and a resident of Middletown, in the county of Middlesex and State of Connecticut, have invented a new and useful Improvement in Wheeled Vehicles, of which the following is a specification.

My present invention consists in providing a wheeled vehicle in which the wheels of a pair upon opposite sides of the vehicle are so arranged that the wheel upon one side of the vehicle is set ahead of the wheel on the other side of the vehicle, thus obviating the sudden jars occasioned by the passing of the vehicle over obstructions across the road—such, for instance, as cross-walks, water-ridges, and the like. By this arrangement one wheel of a pair meets the obstruction first and then the other wheel meets the obstruction instead of both wheels of the pair meeting the obstruction at the same time. A preferable arrangement is one in which the wheel at one side of the vehicle of the front pair is set ahead of its companion wheel on the other side of the vehicle and the wheel of the rear pair is set behind its companion wheel, thus, for instance, causing the left-hand wheel of the front pair to strike the obstruction first, the right-hand wheel of the front pair next, the right-hand wheel of the rear pair next, and finally the left-hand wheel of the rear pair.

Practical embodiments of my invention are represented in the accompanying drawings, in which—

Figure 1:
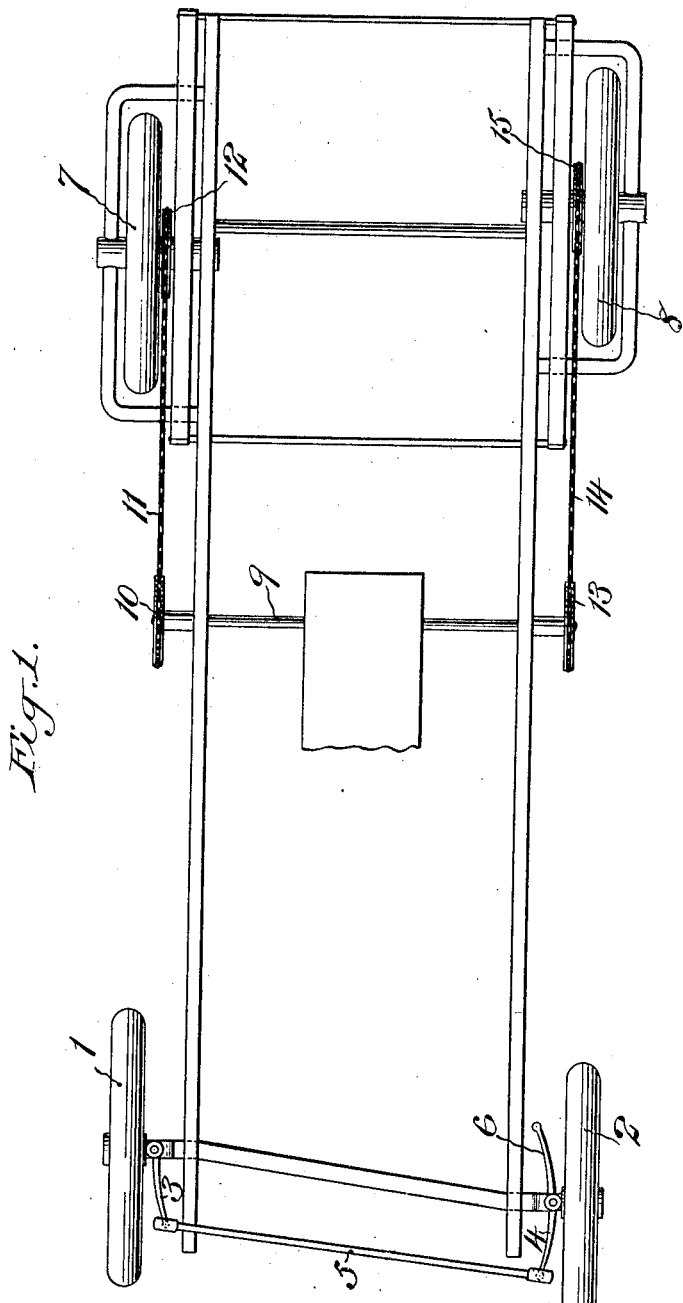
Figure 2:
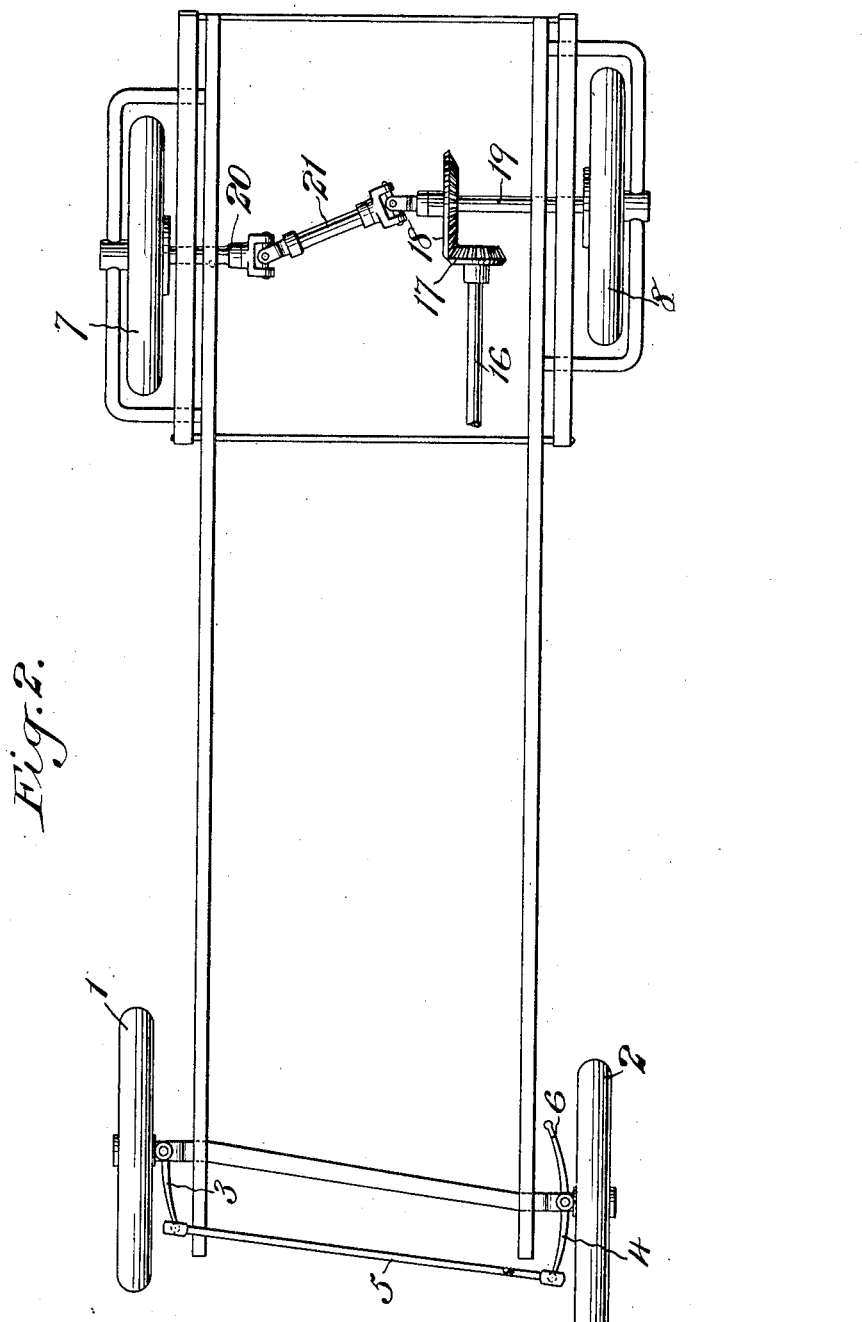
Figure 3:
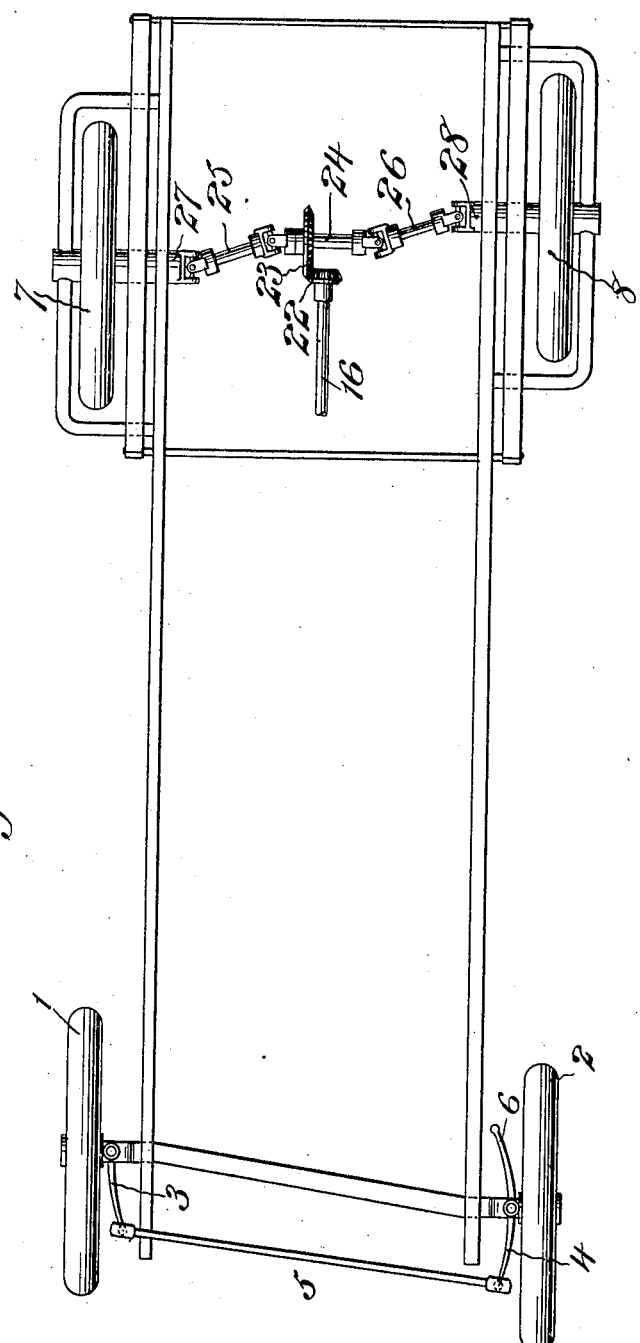

Figure 1 shows in top plan so much of a self-propelled vehicle having a double-chain drive as will give a clear understanding of my invention. Fig. 2 is a similar view of a portion of the self-propelled vehicle having one form of shaft-drive; and Fig. 3 is a similar view of a portion of a self-propelled vehicle, showing another form of shaft-drive.

In all of the views the right-hand wheel of the front pair of wheels is denoted by 1 and the left-hand wheel by 2. These wheels are shown as mounted on stud-axles and are connected by the usual arms 3 and 4 and cross-rod 5, to be turned in unison. An arm 6 is shown for the attachment of the steering-gear. (Not shown herein.)

The wheel 2 is set ahead of the wheel 1 a short distance, so that the wheel 2 will strike an obstruction before the wheel 1. The right-hand wheel of the rear pair of wheels is denoted by 7 and the left-hand wheel by 8. The right-hand wheel 7 is shown as being set ahead of the left-hand wheel 8, so that the wheel 7 will strike an obstruction before the wheel 8. Any obstruction across the road will thereby be struck successively by the wheels 2 1 7 8 instead of first by the wheels 1 and 2 simultaneously and then by the wheels 7 and 8 simultaneously.

In Fig. 1 the wheel 7 is driven from a cross-shaft 9 by a sprocket-and-chain connection 10 11 12, and the wheel 8 is driven from a cross-shaft 9 by a sprocket-and-chain connection 13 14 15. The cross-shaft 9 is driven from any suitable driving mechanism. (Not shown herein.)

In Figs. 2 and 3 the wheels 7 and 8 are driven from a shaft 16, leading to the driving mechanism. (Not shown.) In Fig. 2 the shaft 16 has a bevel-gear connection 17 18 with the axle 19 of the wheel 8 and the axle 20 of the wheel 7 through an axle-section 21, having universal-joint connections with the axles 19 and 20. In Fig. 3 the shaft 16 has a bevel-gear connection 22 23 with an intermediate axle-section 24, having universal-joint connections with axle-sections 25 26, which last-named axle-sections have in turn universal-joint connections with the axles 27 28 of the wheels 7 and 8.

It is evident that various other arrangements might be made which would result in one wheel of each pair of wheels being set in advance of the other wheel of the pair. Hence I do not wish to limit myself strictly to the structure herein set forth; but

What I claim is—

1. A four-wheeled vehicle for use on wagon-roads, having its front and rear wheels on each side arranged to substantially track, one wheel of a pair being set ahead of the other wheel of the pair for obviating the sudden jars occasioned by passing over obstructions across the road.

2. A wheeled vehicle having one wheel of the front pair and one wheel of the rear pair set ahead of the other wheel of each pair for obviating the sudden jars occasioned by passing over obstructions across the road.

3. A wheeled vehicle having the wheels of the front and rear pairs on one side of the vehicle set ahead and behind respectively of the other wheels of the said pairs on the other side of the vehicle for obviating the sudden jars occasioned by passing over obstructions across the road.

In testimony that I claim the foregoing as my invention I have signed my name, in presence of two witnesses, this 25th day of June, 1906.

ISAAC E. PALMER.

Witnesses:
PAUL S. CARRIER,
CHARLES M. SAUER.